Jan. 13, 1953 D. GRISWOLD 2,624,965

TELEPHONE INDICIA CARD HOLDER

Filed Dec. 19, 1949

INVENTOR

DWIGHT GRISWOLD

BY

Semmes, Keegin, Robinson & Semmes

ATTORNEYS

Patented Jan. 13, 1953

2,624,965

UNITED STATES PATENT OFFICE 2,624,965

TELEPHONE INDICIA CARD HOLDER

Dwight Griswold, West Hartford, Conn.

Application December 19, 1949, Serial No. 133,862

1 Claim. (Cl. 40—10.5)

This invention relates to directory indicia and has particular reference to article means for the removable attachment of telephone call sign indicia upon bases of French-type telephone structures.

Although the majority of telephone numbers and call signs may be obtained from the conventional telephone directories, certain numbers or call signs are outstanding and are generally in greater urgent demand than those which are set forth in the conventional directories. For instance, it is important that the person calling or intending to call in a period of emergency have at hand the principal call signs of those persons or agencies with whom he intends to communicate without the necessity of searching for the call signs. The call signs should be available at a glance, no more advantageous repository for these call signs is available than the instrument used for effecting the call. The present invention, therefore, is directed to a means for adapting the call signs to the most convenient portion of a telephone base in the most effectual manner considering economy of space, necessity of accessibility, and facility of removal for change.

It is an object of the invention to provide a unitary call sign indicia containing instrument which is adaptable to the cradle portion of a modern type telephone.

It is a further object of the invention to provide a unitary resilient call sign indicia article which may be made from a single piece of stamped material, the said end product being adaptable to rest on the top of a telephone base between the two side ridges on which the receiver rests and to be disposed underneath the receiver when the receiver is in place on the base.

Yet a further object of the invention is to provide a unitary clamping structure adaptable to the exterior and recessional surfaces of a modern type French telephone base, wherein the call sign indicia may be readily replaced without alteration of structure of the telephone.

Still another object of the invention is to provide a unitary resilient clamping member adaptable to contain removable call sign indicia, wherein the said clamping member is engageable with the exterior cradle portion of the telephone base and to the interior projection formed thereby.

Yet another object of the invention is to provide a call sign indicia bearing article wherein opposed portions of the article serve as gripping surface to secure the article against accidental displacement.

In one type of article covered by the invention, the indicia are inserted into a transparent resilient container having support projections at its four corners. Each of the said projections forms a right angle seat engageable with the outside of the base at approximately the ends of the side receiver supporting ridges, i. e. just below the corner posts which extend upwardly from the ends of the ridges.

A modification of the invention has a plaque covering an area substantially the same as the first mentioned. This particular modification, however, has an extension thereof which is bent upon itself and extends generally parallel to the original plaque structure. The subsurface of the plaque and the interior surface of the extension form clamping surfaces, each of which may frictionally engage contiguous surfaces of that portion of the telephone base described by the two ridges forming the cradle for the receiver.

The conventional modern telephone base has a recess formed immediately beneath this portion described by the two ridges forming the cradle which recess is generally utilized by the manual carrying of telephones. At the foremost extremity of the roof of said recess there is a projection adapted to manual engagement to prevent the slippage of fingers engaging the telephone base. The roof forming the aperture is utilized by the present instrument in that the portion of the extension parallel to the surface of the plaque engages the roof by clamping. Other portions of the extension may be corrugated to conform to the projection which is disposed at the extension of the roof of the recess of the base. Removal of the instrument may be readily effected manually. In one modification, the instrument extension is molded to conform only to the anterior of the recess beyond the projection.

Another modification of the invention is formed substantially similarly to the aforementioned modification yet having a simplified structure. The modification has on the sub-surface of the plaque a recess adapted to receive an indicia bearing card. This innovation may be secured to the telephone base in a manner similar to the first mentioned modification, A detailed description of the several features of the basic structure and the modifications thereof is hereinafter fully set forth in the ensuing description and drawings wherein.

Figure 1:
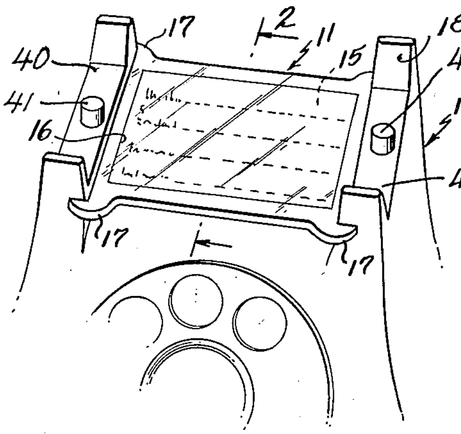
Figure 1 is a view in perspective of the basic telephone adapted structure.
Figure 2:
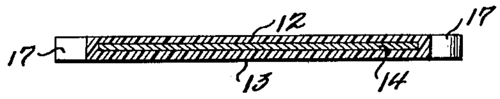
Figure 2 is a view in vertical cross section of the structure shown in Figure 1 taken along line 2—2.

As is specifically shown in the drawings, the particular innovation and modifications thereof are adaptable to securement with a modern telephone base such as is indicated at 10. The particular innovation shown in Figure 1 comprises a unitary plaque structure which is adaptable to manually removable insertion and securement within the confines of a modern telephone base. Material normally utilized in the manufacture of such an article has a resiliency characteristic of a polymerized plastic. Taken by itself, the article is formed or molded of two surfaces 12 and 13. At one lateral extremity of the article, the two surfaces form a longitudinal framed cavity 14 of adequate width and length to enable the insertion of a call sign card 15. Preferably one end of the article is closed as at 16 so that seating of an indicia bearing card may be accomplished without adjustment.

At each extremity of the rectangle there is an ear projection 17 disposed in the same general plane as the plaque 11. Each such projection 17 forms a right angle abutment adapted to engage by friction the outside surface of the telephone base approximately at the ends of the receiver supporting ridges 40 on each side of the base and approximately at the base of the posts 18. The whole plaque article 11 may be inserted on the receiver base between the side ridges 40 through pressure adaptation downwardly. To seat the indicia bearing article 11, it may be forced downwardly from the top of the section 19 described by the side ridges 40, each abutment engaging a right angled corner of a ridge 40. Upon seating, the article is secure against displacement forwardly and laterally, each of the cradle ridges 40 forming a support against lateral displacement. The article is so thin that it will not interfere with the receiver coming to rest on the ridges 40 or depressing the switch buttons 41 which protrude therethrough. In this form of the invention, as in others, it is desirable to have the plaque and each projection thereof conform generally to configuration of exterior telephone base surface to which the respective portions are adjacent. Thus, if the contiguous base section 19 be contoured, so likewise should the sub-surface 13 of the plaque.

Figure 3:
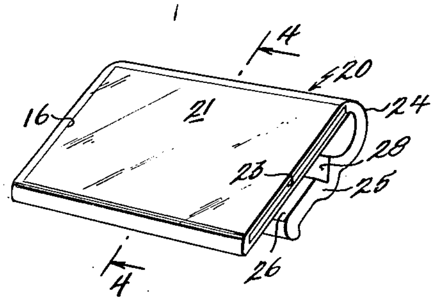
Figure 3 is a view in perspective of a modification of the invention showing the detail of one form of the invention having a plaque and single extension bent upon itself, the said extension having a corrugation therein for securement.

A call sign indicia bearing article 20 such as shown in Figure 3 is placed in contiguous engagement with the exterior base wall formed between the cradle ridges 40. This article 20 has a plaque 21 of general rectangular configuration, the sub-surface 22 thereof being molded of curvilinear shape to conform to the exterior surface 19 of a telephone base. This modification being molded of a resilient sheet material such as a plastic, has a rectangular indicia container cavity 23 formed by the mold. In this manner the cavity 23 mentioned may be constructed without the necessity of any difficult tooling operation. Other means for forming the article include the heat sealing of sheets of preshaped material.

Figure 4:
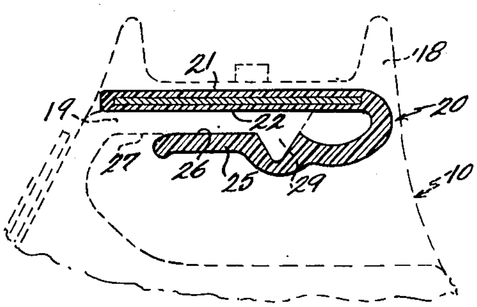
Figure 4 is a view in vertical cross section of the modification shown in Figure 3 taken along lines 4—4 thereof.

Upon heating of the molded sheets, a portion of the sheets may be bent upon itself as at 24 to form a U-shaped extension 25 to the entire clamping structure. See Figure 4 of the drawings. This U-shaped extension 25 is shown having one of its subsurfaces 26 parallel to the subsurface of the plaque 21. The subsurface 26 is adapted to frictional engagement with the subsurface 27 of the cradle roof. Just short of the extension flat surface 26 and beyond the curved portion of the extension, a corrugated section 28 is provided, the said section 28 being adapted to external contiguous engagement with the shoulder projection 29 formed at the rearward extremity of the roof 19 described by the cradle portion of the telephone. Due to the resiliency of the material employed in construction of the instrument, the article may be forcibly inserted upon the cradle portion of the telephone through sliding forcing of the open end of the U-shaped structure externally of the roof 19 described by cradle posts.

Figure 5:
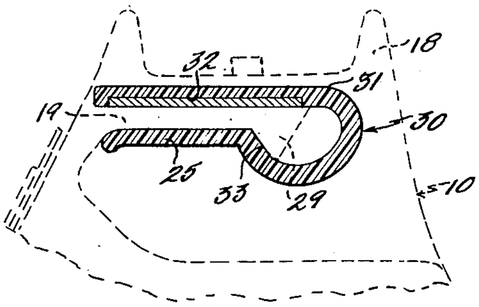
Figure 5 is a vertical cross sectional view of a further modfication of the invention showing a simplified construction over that shown in Figures 3 and 4.

In a modification of the invention such as shown in Figure 5, there is provided a simplified structure 30 wherein a single sheet of plastic material 31 may be utilized to form the entire unitary structure. This modification may be made by stamping and bending during heating as opposed to molding. Here in a single stamping operation the structure is given a recess as at 32 extending generally rectangularly of the plaque portion 31. This particular instrument is constructed substantially the same as the aforementioned second modification and is capable of utilizing approximately the same principle of contiguous frictional engagement with exterior and recessional surfaces of a telephone base. As opposed to other modifications, however, contiguous pressures applied to the exterior of the telephone base by the clamping portions of the article, are applied against an indicia bearing card primarily. Pressures on the card serve to retain position thereof and to firmly seat the indicia bearing article. Engagement of the bent extension 25 is with the interior wall forming the base recess. The inclined portion 33 of the extension engages in contiguous contact with the anterior wall of the extended shoulder 29 of the roof. This clamping engagement prevents rearward displacement of the article from the base and has the advantage of seating the article into secure position.

Due to the characteristics of the materials employed in the manufacture of this instrument, it is possible to attain the particular clamping and securing actions claimed. As indicated, the articles may be molded from any suitable thermoplastic which has a substantial resiliency on hardening. To seat the article, the working or securing surfaces of the article are forced upon exterior and recessional surfaces of the telephone base. To insert the instrument upon a telephone base one must grasp the plaque and extension in one hand inserting and moving the U-shaped article over that section of the telephone base forming the cradle roof and projection, the plaque being guided onto the upper surface of the cradle roof. Forcing the open end of the instrument forwardly of the base will cause contiguous engagement of subsurface of the plaque with the exterior surface of the base and of interior surfaces of the extension with the adjacent surfaces of the roof formed by the cradle. In each innovation shown, with the exception of the basic article of Figure 1, the seating of the article is accomplished cooperatively through the guide provided by cradle posts upon the plaque, and the walls and projection guide of the base recess upon the article extension and its fitted portions.

General reference has been made in the foregoing description to the type of indicia bearing card which may be inserted in the article described. This card may be of any desirable configuration conforming to the interior cavity or recess of any of the modifications. The thickness of the card must conform generally to the preferred thickness of the card bearing article, and therefore may vary from $\frac{1}{16}$ to $\frac{1}{8}$ inch.

The material employed in the manufacture of this card is optional since no resiliency is required. For all practical purposes a card such as may be inserted in the second modification shown in Figure 3 of the drawings, should have relatively unfinished surfaces to assure that engagement with the upper portion of the roof of the cradle section may be substantially frictional. As the surfaces of this card are preferably unfinished both for engagement and for writing purposes, so the subsurface of the plaque portion of the latter two modifications described is preferably unpolished to provide a frictionally engageable surface.

From the foregoing the advantages inherent in the adoption of an article of this kind may be apparent. By way of amplification, each of the innovations described provides a united article capable of bearing emergency call sign indicia which article may be retained by a modern telephone base in an inconspicuous yet readily available manner. The accouterments described do not detract from the exterior appearance of the telephone base nor do the innovations add any substantial disadvantageous impediment to the utilization of the telephone itself. Furthermore, a telephone having one of these innovations adapted thereto may be placed in any position normally occupied since the attached article does fit in a compact and secure manner against the exterior surfaces of telephone base, increasing the size of general outline but slightly. It is further noteworthy that the innovations contemplated are so constructed that manual carriage of the telephone base is in no manner impeded. This is particularly true in view of the preferred thinness of the thermoplastic materials used in the constructions of the articles described.

While the invention has been set forth in its most specific detail in the aforementioned description and drawings, and wherein the various modifications of the invention are described in detail together with the configuration of the portions of the article and types of materials preferred, it is to be noted that the invention is in no wise limited except as set forth in the succeeding claim which is appended hereto.

I claim:

In a telephone directory article adaptable to a modern telephone base having on its top a receiver supporting ridge on each side, each ridge having a switch button protruding upwardly therefrom, a rectangular plaque in length substantially the same distance as the distance between said ridges to provide a frictional holding fit, ear projections extending from each corner of said rectangular plaque, each said ear having a cut-out adapted for engagement with the outside of the base at approximately opposite the ends of said ridges of the said telephone base below the upper surface of said ridges, the said plaque having an indicia bearing means containing cavity therein and indicia bearing means for insertion in the said plaque cavity.

DWIGHT GRISWOLD.

REFERENCES CITED

The following references are of record in the file of this patent:

UNITED STATES PATENTS

| Number | Name | Date |
|---|---|---|
| 1,837,217 | Hayward | Dec. 22, 1931 |
| 1,896,352 | Diveash | Feb. 7, 1933 |
| 2,408,194 | Bourdius | Sept. 24, 1946 |
| 2,535,265 | Caffrey | Dec. 26, 1950 |
| 2,540,221 | Ten Hoeve | Feb. 6, 1951 |
| 2,541,712 | Neblett | Feb. 13, 1951 |
| 2,584,769 | Westlake | Feb. 5, 1952 |